(12) United States Patent
Kyrylenko et al.

(10) Patent No.: US 6,993,126 B1
(45) Date of Patent: Jan. 31, 2006

(54) APPARATUS AND METHOD FOR DETECTING FAR END SPEECH

(75) Inventors: Mykola Kyrylenko, West Lakes (AU); Lambertus Anthony Mary Voskulen, Belair (AU)

(73) Assignee: Clearsonics Pty Ltd, Adelaide ( * ) Notice: Subject to any disclaimer, the term of this patent is extended or adjusted under 35 U.S.C. 154(b) by 0 days.

(21) Appl. No.: 09/959,459

(22) PCT Filed: Apr. 28, 2000

(86) PCT No.: PCT/AU00/00375

§ 371 (c)(1),
(2), (4) Date: Feb. 28, 2002

(87) PCT Pub. No.: WO00/65818

PCT Pub. Date: Nov. 2, 2000

(30) Foreign Application Priority Data

Apr. 28, 2000 (AU) ........................................ PP9991

(51) Int. Cl.
  *H04M 1/00* (2006.01)
  *H04M 9/00* (2006.01)

(52) U.S. Cl. .................. 379/392; 379/388.06; 379/391
(58) Field of Classification Search ..............................
  379/406.01–406.16, 388.06, 390.03, 391, 379/392

See application file for complete search history.

(56) References Cited

U.S. PATENT DOCUMENTS

| 4,879,745 A | * | 11/1989 | Arbel .................... 379/388.06 |
| 5,353,348 A | | 10/1994 | Sendyk et al. |
| 5,381,475 A | | 1/1995 | Cavallo |
| 5,553,137 A | | 9/1996 | Nyhart et al. |
| 5,974,138 A | | 10/1999 | Sambhwani et al. |

FOREIGN PATENT DOCUMENTS

EP            0901267 A2      3/1999

(Continued)

*Primary Examiner*—Curtis Kuntz
*Assistant Examiner*—Alexander Jamal
(74) *Attorney, Agent, or Firm*—Sughrue Mion, PLLC (57) ABSTRACT

Method and apparatus for detecting far end speech in a telephone apparatus. A speaker (14) produces far end sound from a far end signal, when received by the telephone apparatus. A microphone (12) generates a near end signal from near end sound, for transmission from the telephone apparatus. A hybrid (24) which passes the near and far end signals from an external two wire link (30) to and from the speaker and microphone, on respective first and second paths (1, 2) of a four wire link (28). Muting of the near end signal is effected when signal derived from the first path (1) of the four wire link (28) is detected as being representative of a condition of existence of far end signal. Signal determined as representing sidetone signal deriving from the near end signal from the speaker (14), and appearing in the signal on the first path (1) of the four wire link (28), pursuant to traverse of part of the near end signal through the hybrid, is subtracted from the signal derived from the first path (1) of the four wire link (28). Existence of the condition of existence of far end signal is then determined on the basis of the result of the subtraction.

12 Claims, 5 Drawing Sheets

FOREIGN PATENT DOCUMENTS

| | | |
|---|---|---|
| JP | 6-209362 | 7/1994 |
| JP | 7-131389 | 5/1995 |
| JP | 7-177060 | 7/1995 |
| JP | 7-303067 | 11/1995 |
| JP | 7-303073 | 11/1995 |
| JP | 10-93482 | 4/1998 |
| JP | 10-112745 | 4/1998 |
| JP | 11-289280 | 10/1999 |
| WO | WO 94/08418 A1 | 4/1994 |
| WO | WO 97/49196 A2 | 12/1997 |

* cited by examiner

APPARATUS AND METHOD FOR DETECTING FAR END SPEECH

This is a National Stage of International Application PCT/AU00/00375, with an international filing date of Apr. 28, 2000, and the complete disclosure of which is incorporated into this application by reference.

BACKGROUND OF THE INVENTION

This invention relates to apparatus and method for detecting far end speech.

In telephone systems designed to operate with a half duplex communications system, the outgoing speech signal from the near end telephone apparatus is muted so as not to be transmitted to the far end user when the far end user is speaking. Otherwise, the far end speech is muted, at the near end telephone apparatus. This may be effected by detecting at the near end a condition where the received far end speech signal is of significant magnitude, and, if so, effecting muting at the near end of the outgoing near end speech signal, the far end speech signal at the near end telephone apparatus otherwise being muted.

Telephone apparatus for implementing the above generally employs, internally, four wire signal transmission. That is to say, the signals from and to the telephone microphone and loudspeaker respectively are on separate communications paths, this being necessary to enable near end and far end signals to be distinguished as necessary for performing half duplex operation. The telephone apparatus may thus incorporate a hybrid the purpose of which is to couple the two and four wire signal paths. At the microphone and loudspeaker, the signals are in analogue form. Transmission over the communications link between the near and far end telephone apparatuses will normally be effected by analog signals over a two wire link, such as a Public Subscriber Telephone Network (PSTN). Internally, each telephone apparatus may incorporate some means for converting to and from digital and analogue signal formats.

If the impedance characteristics of the hybrid provide exact signal matching, outgoing near end signal, from the near end microphone, is directed entirely to the two wire link. However, if there is imperfect matching, some part of the near end signal from the near end microphone will pass through the hybrid to be mixed with incoming far end signal on the signal path to the speaker of the near end telephone apparatus. Practically, it is impossible to ensure exact matching, so there is always some returned signal of this kind, called "sidetone".

The existence of sidetone signal presents a particular problem in half duplex signal transmission, because it can interfere with the ability to detect, at the users' telephones, when the far end user is or is not speaking, with the consequence that conditions requiring muting or non-muting of speech signals are not properly detected. A particular problem of this nature occurs where the near end telephone is in an environment where there is an acoustically noisy background. In this case, the side-tone signal may be of significant magnitude, such that detection of a condition where the far end user is not speaking is not properly effected because there is sufficient sidetone signal mixed with the incoming far end speech signal to initiate muting of the outgoing near end speech signal, regardless of whether or not the far end user is speaking, it being impossible to distinguish the sidetone from the far end user's speech signal. That is, at the near end telephone, side-tone signal is detected and interpreted as indicating a condition where the far end user is speaking, so that the far end signal is, perhaps constantly, muted at the near end user's telephone. Of course, in this circumstance, communication between the parties is interfered with and may be rendered impossible.

SUMMARY OF THE INVENTION

In one aspect, the invention provides detection apparatus for detecting far end speech in a telephone apparatus having a first transducer for reproducing far end sound from a far end signal, when received by the telephone apparatus, and a second transducer for generating a near end signal from near end sound, for transmission from the telephone apparatus, and in which the near end signal is muted for transmission from the telephone apparatus in the case where it is intended that a user of the telephone apparatus should listen to the reproduced far end sound, and a hybrid for passing the near and far end signals from an external two wire link to and from the first and second transducers on respective first and second paths a four wire link, the detection apparatus being in use responsive to effect said muting of the near end signal when signal derived from said first path of said four wire link is detected as being representative of a condition of existence of far end signal, and subtracting, from the signal derived from said first path of said four wire link, signal determined as representing sidetone signal deriving from the near end signal from the second transducer and appearing in the signal on said first path of said four wire link pursuant to traverse of at least part of the near end signal through the hybrid, existence of said condition being determined on the basis of the result of the subtraction of the signal determined as representing sidetone signal from the signal on said first path of said four wire link.

By this, the signal on the basis of which detection of existence of said condition is made may be made more representative of the far end signal. Thereby, reliability of operation of the telephone apparatus may be improved.

In embodiments of the invention the signal determined as representing sidetone signal is, in use, derived from said second path of said four wire link.

The detection apparatus may be implemented as hardware, but it may more conveniently be implemented wholly or partly as software. In a software implementation, the software ma %, implement a subtracter in use effecting said subtracting.

The subtracting may be effected by generating, from the signal on said second path of said four wire link, a first relatively fast tracking envelope of the signal on said second path of said four wire link, and subtracting a proportion of the first envelope from the signal derived from the first path of the four wire link. The first envelope may, in the case where a condition of existence of far end speech was previously detected, be the envelope of the muted near end signal, and otherwise is the envelope of the non-muted near end signal.

The detection apparatus may be effective in use to generate a detection signal, indicative of said condition, from the long term envelope of signal representing the result of said subtraction, and the short term envelope of that signal. The detection signal may be representative of a condition where no far end speech is present when if a condition of detection of far end speech prevails, a short term envelope of said signal representing the result of said subtraction is less than a mean based on the product of a noise long term envelope and the long term envelope of signal representing the result of said subtraction, and representative of a condition where far end speech is present when, if a condition of detection of far end speech does not prevail, a very short term envelope of said signal representing the result of said subtraction is greater than said mean based on the product of a noise long term envelope and the long term envelope of signal representing the result of said subtraction.

The detection apparatus may in use apply the detection signal to incrementally adjust the magnitude of a hold signal, which hold signal when it reaches a threshold level controls the telephone apparatus to effect said muting of the near end signal, but otherwise which so controls the telephone apparatus that the near end signal is not muted.

In a particular form, the detection apparatus has:

a near very short term envelope generator for generating a near very short term envelope signal representing the very short term envelope of the near end sound: and a subtracter for generating a difference signal by subtracting a proportion of a muted component of the near very short term envelope signal from the far end signal, in case of existence of a detected condition of far end speech, or otherwise subtracting a proportion of a non-muted component of the near very short term envelope signal from the far end signal;

an output of the apparatus in use being indicative of said condition of the existence of far end speech when said difference signal exceeds a predetermined magnitude.

The invention also provides a method of detecting far end speech in a telephone apparatus having first transducer for reproducing far end sound from a far end signal, when received by the telephone apparatus, a second transducer for generating a near end signal from near end sound, for transmission from the telephone apparatus, and in which the near end signal is muted for transmission from the telephone apparatus under in the case where it is intended that a user of the telephone apparatus should listen to the reproduced far end sound, and a hybrid for passing the near and far end signals from an external two wire link, to and from the first and second transducers on respective first and second paths a four wire link, the method comprising effecting said muting of the near end signal when signal derived from said first path of said four wire link is detected as being representative of a condition of existence of far end signal, and subtracting, from the signal derived from said first path of said four wire link, signal determined as representing sidetone signal deriving from the near end signal from the second transducer and appearing in the signal on said first path of said four wire link pursuant to traverse of at least part of near the end signal through the hybrid, existence of said condition being determined on the basis of the result of the subtraction of the signal determined as representing sidetone signal from the signal on said first path of said four wire link.

By this, the signal on the basis of which detection of existence of said condition is made may be made more representative of the far end signal. Thereby, reliability of operation of the telephone apparatus may be improved.

In embodiments of the method of invention the signal determined as representing sidetone signal is derived from said second part of said four wire link.

The subtracting may be effected be generating, from the signal on said second path of said four wire link, a first relatively fast tracking envelope of the signal on said second path of said tour wire link, and subtracting a proportion of the first envelope from the signal derived from the first path of the four wire link. The first envelope my, in the case where a condition of existence of far end speech was previously detected, be of the muted near end signal, and otherwise be of the non-muted near end signal.

The method may further comprise generating a detection signal, indicative of said condition, from the long term envelope of signal representing the result of said subtraction, and the short term envelope of that signal. The detection signal may be representative of a condition where no far end speech is present when, if a condition of detection of far end speech prevails, a short term envelope of said signal representing the result of said subtraction is less than a mean based on the product of a noise long term envelope and the long term envelope of signal representing the result of said subtraction and representative of a condition where far end speech is present when, if a condition of detection of far end speech does not prevail, a very short term envelope of said signal representing the result of said subtraction is greater than said mean based on the product of a noise long term envelope and the long term envelope of signal representing the result of said subtraction.

The detection signal may be applied to incrementally adjust the magnitude of a hold signal, which hold signal when it reaches a threshold level controls the telephone apparatus to effect said muting of the near end signal, but otherwise which so controls the telephone apparatus that the near end signal is not muted.

In a particular form, the method further comprises:

generating a near very short term envelope signal representing the very short term envelope of the near end sound;

generating a difference signal by subtracting a proportion of a muted component of the S neai very short term envelope signal from the far end signal, in case of existence of a detected condition of far end speech, or otherwise subtracting a proportion of a non-muted component of the near very short term envelope signal from the far end signal; and generating an output indicative of said condition of the existence of far end speech when said difference signal exceeds a predetermined magnitude.

The detection apparatus and method may repetitively execute steps of generating near very short term envelope signal, and generating said difference signal.

The invention also provides a telephone apparatus fitted with the detection apparatus of the invention.

BRIEF DESCRIPTION OF THE DRAWINGS

The invention is further described by way of example with reference to the accompanying drawings in which:

FIGS. 2 ($a$), 2 ($b$), 2($c$) and 2 ($d$) illustrate signal waveforms relevant to the operation of the telephone apparatus of FIG. 1:

DETAILED DESCRIPTION OF THE INVENTION

Figure 1:
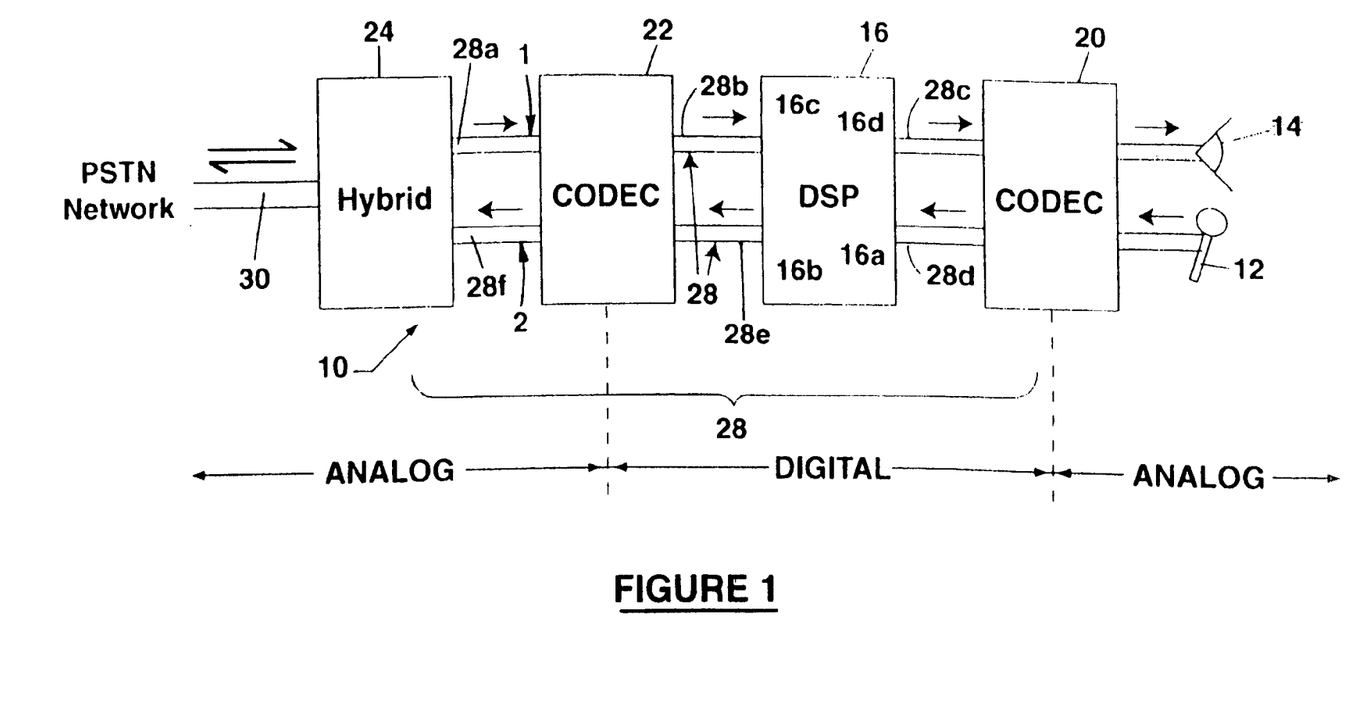
FIG. 1 is a diagram of a half duplex telephone apparatus constructed in accordance with the invention.

FIG. 1 shows a telephone apparatus 10, intended for half-duplex operation. This has a microphone 12 for generating a near end electrical signal from speech sound from a user, and a speaker 14 for reproducing sound from an applied far end electrical signal.

The apparatus 10 also incorporates a control device 16, two codecs 20, 22 and a hybrid 24. The control device 16 operates on digitised signals, in a manner described later, to effect half duplex operation of communications to and from the telephone apparatus.

The codec 20 is positioned between the control device 16 and the microphone 12, and serves to digitise near end analogue signal from the microphone for application to the control device 16. The codec 20 also acts to convert digitised far end signal received from the control device 16 to analogue form for application to the speaker 14.

Codec 22 is positioned between the control device 16 and the hybrid 24. It serves to convert digital far end signal from the control device 16 to analogue form, for application to the hybrid 24, and to convert analogue far end signal from the hybrid 24 to digital form for application to the control device 16.

The signal link 28 between the hybrid 24, control device 16, codecs 20,22, microphone 12 and speaker 14 is a four wire link. That is to say, incoming far end signal travels on a path "1" of the link 28, formed of link parts 28a, 28b, and 28c from the hybrid 24 to the speaker 14, being separate from the path "2" of link 28, formed of link parts 28d, 28e and 28f on which signal travels from the microphone 12 to the hybrid 24. The hybrid 24 serves to connect the four wire signal paths of link 28 to the two wire link provided by a public subscriber telephone network 30, via which communication between the telephone apparatus 10 and another similar apparatus is established.

In the case where the hybrid 24 provides perfect matching as between the four wire signal link in the telephone apparatus 10, and the two wire PSTN, signals to and from the telephone apparatus 10 travel to and from the telephone apparatus with outgoing signal from the codec 22 going wholly to the PSTN, and incoming signal from the PSTN going wholly to the codec 22. If, however, there is any mis-match provided by the hybrid 24, some part of the outgoing near end signal from the codec 22 will be pass through the hybrid 24 and be returned to the codec 22 as sidetone. Practically, there will always be some returned sidetone, since it is impossible to reliably ensure that perfect matching occurs.

The function of the control device is, responsive to existence of digitised far end signal at the respective input 16c thereto, to mute the digitised near end speech signal applied at the relevant input 16a thereof, so that only a significantly reduced near end signal is passed to the corresponding output 16b thereof, and thence to the PSTN via the codec 22 and hybrid 24. When far end signal is not detected at input 16c to control device 16, incoming far end signal applied to input 16c is muted so as only a significantly reduced signal appears at the respective output 16d of the control device 16.

The satisfactory operation of a simple arrangement where muting is dependent on the existence of signal at the input 16c to the control device 16 is dependent upon the signal at that input accurately representing the far end speech. However, the applied signal will not comprise only the far end speech signal if there is significant sidetone signal present. Particularly if the telephone apparatus is situated in a noisy environment, the applied signal may, depending on the degree of perfection of matching provided by the hybrid 24, include a significant sidetone component, and this may give rise to faulty operation. That is, if the sidetone signal is significant, the control device may interpret this as indicating the presence of far end speech signal where no such signal exists. Thus the outgoing speech signal may be muted, possibly constantly, but in any event for times which render difficult or impossible ordinary voice communication between the users.

In order to improve the resistance offered by the control circuit 16 to unintended muting arising in the above way, the control device 16 is arranged to discriminate between far end speech signal and sidetone, and to be responsive, to a substantial extent, only to the far end speech signal.

Figure 2A:
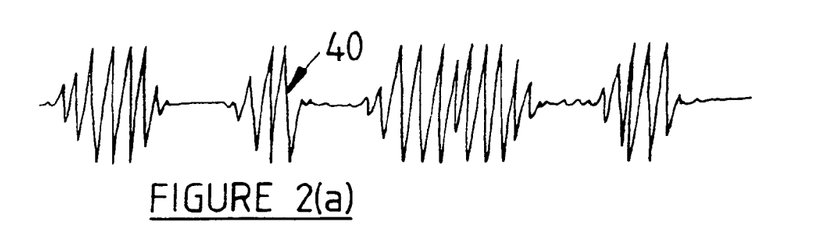
Figure 2B:
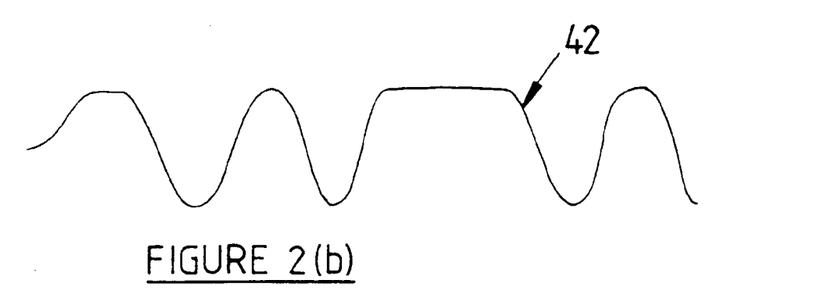
Figure 2C:
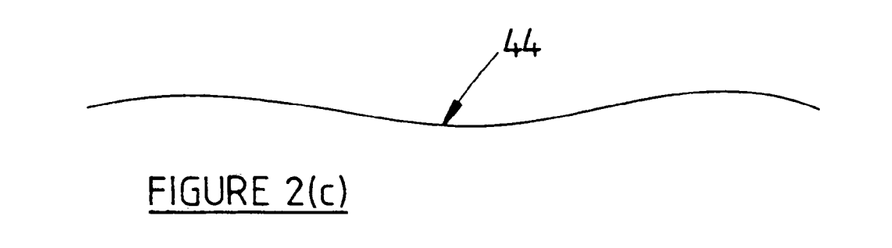
Figure 2D:
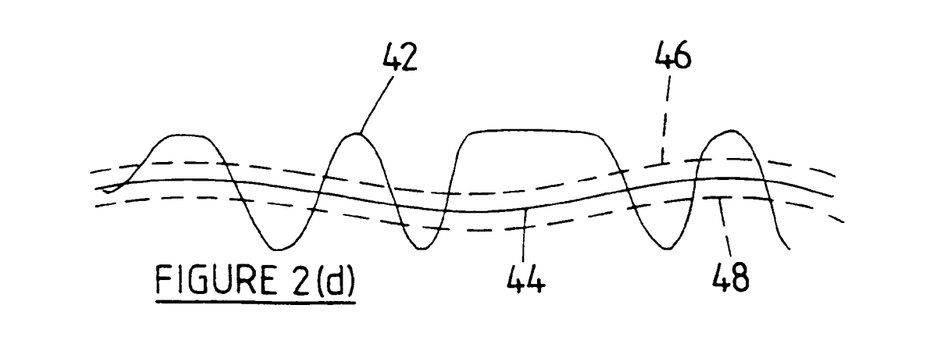

FIG. 2(a) is a graphical representation of a typical speech signal 40. The signal 40 contains components of various frequencies, but as shown in FIG. 2(b) the fast tracking envelope 4' of the signal 40 exhibits a pulse-like character. On the other hand, a slow tracking envelope 44 of the speech signal 40 will appear as in FIG. 2(c). While this slow tracking envelope 44 exhibits timewise variation, that variation is substantially less. FIG. 2(d) shows the envelopes 42 and 44 overlaid. The technique employed in this embodiment of the invention involves responding to conditions where the amplitude of the fast envelope exceeds that of the slow tracking envelope by a determined amount. In particular, conditions are detected where the prevailing positive amplitude of the fast tracking envelope is greater by a predetermined margin than that of the slow tracking envelope, and where the prevailing negative amplitude of the fast tracking envelope is less by a predetermined margin than that of the slow tracking envelope. The margins in question may be selected as appropriate, being represented by lines 46, 48 in FIG. 2(d).

Figure 3:
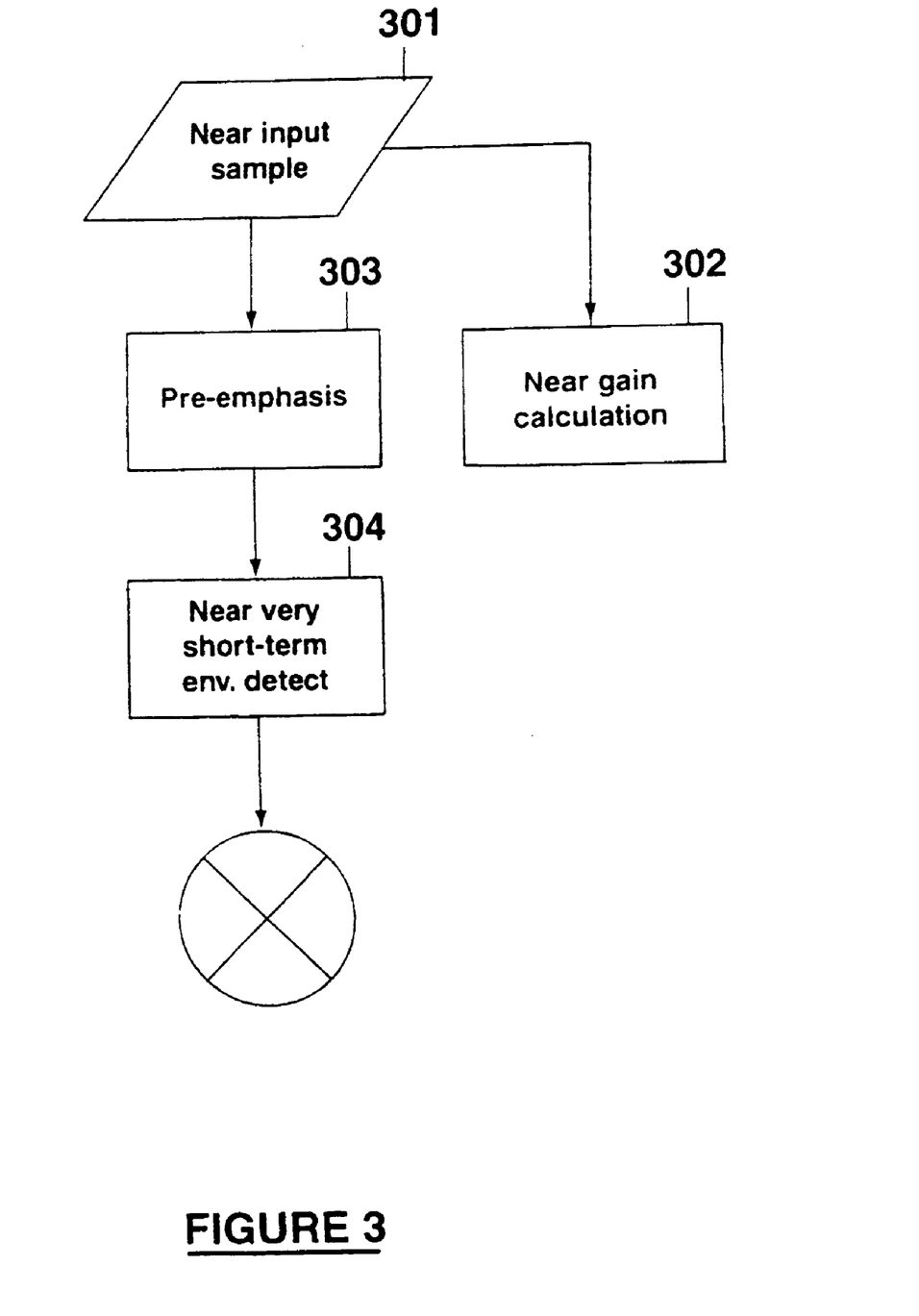
FIG. 3 is a diagram of steps executed by a near end speech detector, in one embodiment of the invention.
Figure 4:
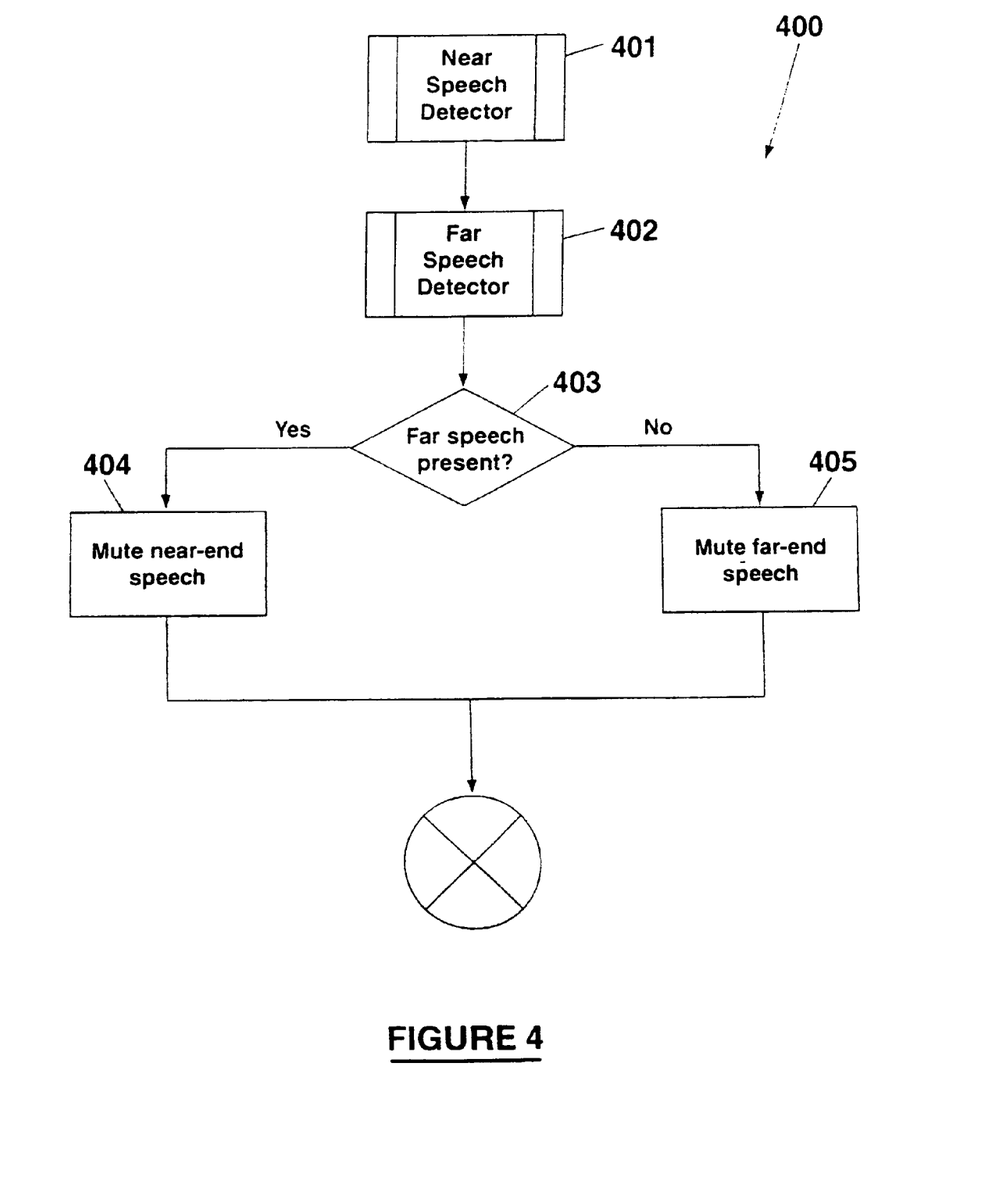
FIG. 4 is a diagram of steps executed by a half duplex switching device, in one embodiment of the invention.
Figure 5:
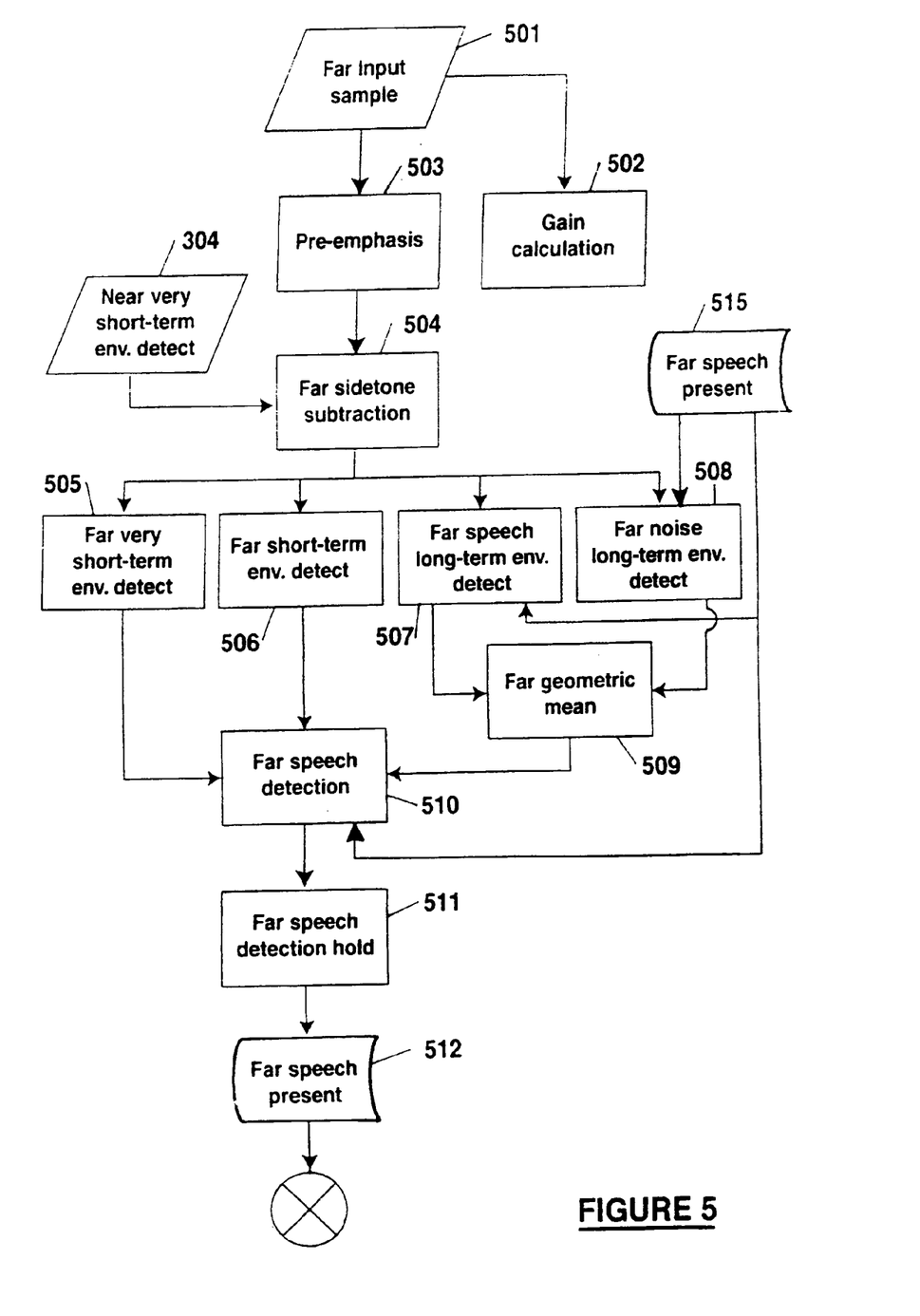
FIG. 5 is a diagram of steps executed by a far speech detector, in one embodiment of the invention.

The above is effected under software control within the control device 16. There are three basic parts to this, namely half duplex switching, far speech detection and near speech detection. Process steps in implementing each of these functions are illustrated in FIGS. 3 to 5. The steps illustrated are executed cyclically and repetitively, as now described.

In the following description. "near end speech signal" refers to the signal on link part 28d of link path 2 of four wire link 28, as applied to the device 16, from the microphone 12, and "far end speech signal" refers to the signal on link part 28b of link path 1, as applied to the device 16, or as subsequently processed. Of course, at link part 28b, to some extent within device 16, and even when the signal is passed from device 16 to speaker 14, the far end speech signal may represent only one component of the signal passing to, within, or from device 16, since some sidetone component may be included. Similarly, there may for example be associated noise components.

Referring to FIG. 4, near speech detection is executed first, at step 401. This is used, as described later with reference to FIG. 3, to calculate the near very-short-term envelope, for use in far speech detection.

Next, a far speech detection function is called, at step 402. This function, described later with reference to FIG. 5, is used to detect if far-end speech is present.

At the next step, 403, if far-end speech is present, then signals from the near end are muted, at step 404. Otherwise, if far speech is not present, signals form the far end are muted, at step 405. Generally, muting is effected so as to greatly reduce, but not entirely eliminate, the affected signal.

Near Speech Detection

The input to the near speech detector 300 (FIG. 3) is a near input sample 301. Near end samples 301 are obtained repetitively from the near end speech signal, the latter being sampled internally of the control device 16 at a received at a rate of 8000 Hz, so that a fresh sample is obtained every 125 microseconds. The near input samples are applied to a near gain calculator 302, to limit digital clipping. Following this, pre-emphasis is applied, at step 303, to emphasise the higher frequencies, which assists in speech detection. The output from step 303 is the calculated magnitude of the pre-emphasised near signal.

The near very short-term envelope detector 304 operates on the output from step 303, and operates in the same way as the far very short-term envelope detector 505 described below with reference to FIG. 5, except that it operates on the near end signal to provide at its output the near very short term envelope.

Far Speech Detector

The input to the far speech detector 500 (FIG. 5) is the far input sample 501. Far input samples 501 are obtained repetitively from the far end speech signal, the latter being sampled internally of the control device at a rate of 8000 Hz, so that a fresh sample is obtained every 125 microseconds. The samples are applied to a far gain calculator 502 to limit digital clipping. Pre-emphasis is effected at step 503 to emphasise the higher frequencies, which assists in speech detection. Output from step 503 is the magnitude of the pre-emphasised far signal.

Far sidetone subtraction is employed, at step 504, to remove the sidetone caused by the near end signal on the far side. The operation is as follows:

if far speech is present, then a proportion of the muted component of near very short-term envelope, generated at step 304 is subtracted from the far signal magnitude.

Otherwise, a proportion of the non-muted component of near very short-term envelope generated at step 304 is subtracted from the far signal magnitude.

The proportion of signal subtracted is preselected, for example being determined by user trials to ensure near end noise does not result in far-end speech being detected, but that detection of actual far-end speech is sufficiently sensitive.

A far very short term envelope detector 505 generates a very fast reacting envelope on the far end signal. The operation is as follows:

if the far signal magnitude is greater than the far very short-term envelope, then the latter envelope is updated by summing a proportion of the signal magnitude, with an inverse proportion of the existing very short-term envelope. Otherwise, a "capacitive" decay is applied to the existing very short-term envelope.

The proportion of signal magnitude and the speed of capacitive decay are, relatively, very fast. This envelope is intended only to smooth the signal marginally.

A far short-term envelope detector 506 operates in the same way as the very short-term envelope detector, except that it employs a slower rise time (ie a smaller proportion of the signal magnitude is used) and slower capacitive decay. This envelope is intended to accurately trace the speech envelope.

Far speech long-term envelope detection is effected at step 507 in two modes: tracking mode and drift mode. Tracking mode operates when far speech is indicated, at step 515, as having been present (ie as having been detected during a previous cycle of operation), otherwise drift mode operates.

In tracking mode, the far speech long-term envelope detector operates in the same way the far short-term envelope detector, but with even slower rise time and capacitive decay.

In drift mode, the far speech long-term envelope detector has a capacitive decay similar to that mentioned above) with offset added.

Far noise long-term envelope detection is effected at step 508 in the same way as far speech long-term envelope detection, except that, in this case, tracking mode is active when no far speech is present, and drift mode is active when far speech is present.

The far geometric mean of the far speech long-term envelope and the noise long-term envelope is calculated at step 509, this being the square root of the product of the speech long-term envelope and the noise long-term envelope.

Far speech detection occurs, at step 510 as follows:

if far speech was detected previously (step 515) and the far short-term envelope (step 506) is less than the aforementioned far geometric mean multiplied by a hysteresis factor, then speech is taken as not being detected. Otherwise, if far speech was not detected decrement hold on speech being present. If speech is no longer to be held, the speech is set to not being present.

Far speech detection is thus effected at this point by a method corresponding to that described above with reference to FIG. 2, the long term envelope 44 however being adjusted to take account of noise and hysteresis (and so represented by the described geometric mean multiplied by a hysteresis factor) and the far short term envelope being adjusted to a "very short term" envelope in the case where there is no condition of previous detection of speech.

Speech detection hold is effected at step 511, this operating as follows:

if far speech was detected, that condition is set at step 512 and, at step 511, a hold on speech present condition is set at step 515, the latter condition being set as a desired numerical value;

otherwise, if far speech was not detected, the hold on speech being present numerical value (step 511) is decremented. If a condition of speech no longer held is reached (ie the numerical value held at step 511 is decremented to a predetermined value), then a condition of speech not being present is set at step 512.

The hold on speech function described is used to avoid rapid switching between conditions where speech is indicated as being present and not being present.

Generally, in the described control circuit, speech is detected/not detected on repetitive cycles of operation of the device, but speech may be regarded as being present even if speech was not detected.

The described arrangement has been advanced merely by way of explanation and many modifications may be made thereto without departing from the spirit and scope of the invention which includes every novel feature and combination of novel features herein disclosed. For example, while a specific method based on envelope detection is described for using, the difference signal resulting from subtraction of the sidetone signal from the part 28b of link 28 for determining whether far end speech exists, in principle any, known technique for performing this detection based on input directly of signal from the link part 28b may be adapted by providing that this difference signal is used as input instead of the signal on link part 28b.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. Detection apparatus for detecting far end speech in a telephone apparatus having a first transducer for reproducing far end sound from a far end signal, when received by the telephone apparatus, and a second transducer for generating a near end signal from near end sound, for transmission from the telephone apparatus, and in which the near end signal is muted for transmission from the telephone apparatus in the case where it is intended that a user of the telephone apparatus should listen to the reproduced far end sound, and an hybrid for passing the near and far end signals from an external two wire link to and from the first and second transducers on respective first and second paths of a four wire link, the detection apparatus being in use responsive to effect said muting of the near end signal when signal derived from said first path of said four wire link is detected as being representative of a condition of existence of a far end signal, and subtracting, from the signal derived from said first path of said four wire link, signal determined as representing sidetone signal deriving from the near end signal from the second transducer and appearing in the signal on said first path of said four wire link pursuant to traverse of at least part of the near end signal through the hybrid, existence of said condition being determined on the basis of the result of the subtraction of the signal determined as representing sidetone signal from the signal on said first path of said four wire link;

wherein the signal determined as representing sidetone signal is, in use, derived from said second path of said four wire link;

wherein said subtracting is effected by generating, from the signal on said second path of said four wire link, a first relatively fast tracing envelope of the signal on said second path of said four wire link, and subtracting a proportion of the first envelope from the signal derived from the first path of the four wire link; and wherein the first envelope is, in the case where a condition of existence of far end speech was previously detected, the envelope of the muted near end signal, and otherwise is the envelope of the non-muted near end signal.

2. A detection apparatus as claimed in claim 1, effective in use to generate a detection signal, indicative of said condition, from the long term envelope of signal representing the result of said subtraction, and the short term envelope of that signal.

3. A detection apparatus as claimed in claim 2, wherein the detection signal is representative of a condition where no far end speech is present when, if a condition of detection of far end speech prevails, a short term envelope of said signal representing the result of said subtraction is less than a mean based on the product of a noise long term envelope and the long term envelope of signal representing the result of said subtraction, and said detection signal is representative of a condition where far end speech is present when, if a condition of detection of far end speech does not prevail, a very short term envelope of said signal representing the result of said subtraction is greater than said mean based don the product of a noise long term envelope and the long term envelope of signal representing the result of said subtraction.

4. A detection apparatus as claimed in claim 2, wherein, in use, the detection signal is applied to incrementally adjust the magnitude of a hold signal, said hold signal, when it reaches a threshold level, controls the telephone apparatus to effect said muting of the near end signal, but otherwise which so controls the telephone apparatus that the near end signal is not muted.

5. A detection apparatus as claimed in claim 1, having a near very short term envelope generating a near very short term envelope signal representing the very short term envelope of the near end sound; and a subtracter for generating a difference signal by subtracting a proportion of a muted component of the near very short term envelope signal from the far end signal, in case of existence of a detected condition of far end speech, or otherwise subtracting a proportion of a non-muted component of the near very short term envelope signal from the far end signal;

an output of the apparatus in use being indicative of said condition of the existence of far end speech when said difference signal exceeds a predetermined magnitude.

6. Apparatus as claimed in claim 5, wherein, in use steps of generating near very short term envelope signal, and generating said difference signal are executed repetitively.

7. A method of detecting far end speech in a telephone apparatus having a first transducer for reproducing far end sound from a far end signal, when received by the telephone apparatus, a second transducer for generating a near end signal from near end sound, for transmission from the telephone apparatus, and in which the near end signal is muted for transmission from the telephone apparatus in the case wherein it is intended that a user of the telephone apparatus should listen to the reproduced far end sound, and a hybrid for passing the near and far end signals from an external two wire link to and from the first and second transducers on respective first and second paths of a four wire link, the method comprising effecting said muting of the near end signal when signal derived from the said first path of said four wire link is detected as being representative of a condition of existence of a far end signal, and subtracting, from the signal derived from said first path of said four wire link, signal determined as representing sidetone signal deriving from the near end signal from the second transducer and appearing in the signal on said first path of said four wire link pursuant to traverse of at least part of the near end signal through the hybrid, existence of said condition being determined on the basis of the result of the subtraction of the signal determined as representing sidetone signal from the signal on said first path of said four wire link;

wherein said subtracting is effected by generating, from the signal on said second path of said four wire link, a first relatively fast tracking envelope of the signal on said second path of said four wire link, and subtracting a proportion of the first envelope from the signal derived from the first path of the four wire link; and wherein the first envelope is, in the case where a condition of existence of far end speech was previously detected, the envelope of the muted near end signal, and otherwise is the envelope of the non-muted near end signal.

8. A method as claimed in claim 7, further comprising generating a detection signal, indicative of said condition, from the long term envelope of signal representing the result of said subtraction, and the short term envelope of that signal.

9. A method as claimed in claim 8, wherein the detection signal is representative of a condition where no far end speech is present when, if a condition of detection of far end speech prevails, a short term envelope of said signal representing the result of said subtraction is less than a mean based on the product of a noise long term envelope and the long term envelope of signal representing the result of said subtraction, and said detection signal is representative of a condition where far end speech is present when, if a condition of detection of far end speech does not prevail, a very short term envelope of said signal representing the result of said subtraction is greater than said mean based don the product of a noise long term envelope and the long term envelope of signal representing the result of said subtraction.

10. A method as claimed in claim 8, wherein the detection signal is applied to incrementally adjust the magnitude of a hold signal, which hold signal when it reaches a threshold level controls the telephone apparatus to effect said muting of the near end signal, but otherwise which so controls the telephone apparatus that the near end signal is not muted.

11. A method as claimed in claim 7, further comprising generating a near very short term envelope signal representing the very short term envelope of the near end sound;

generating a difference signal by subtracting a proportion of a muted component of the near very short term envelope signal from the far end signal, in case of existence of a detected condition of far end speech, or otherwise subtracting a proportion of a non-muted component of the near very short term envelope signal form the far end signal; and generating an output indicative of said condition of the existence of far end speech when said difference signal exceeds a predetermined magnitude.

12. A method as claimed in claim 11, wherein steps of generating near very short term envelope signal, and generating said difference signal are executed repetitively.

* * * * *

UNITED STATES PATENT AND TRADEMARK OFFICE
CERTIFICATE OF CORRECTION

PATENT NO. : 6,993,126 B1 Page 1 of 1
APPLICATION NO. : 09/959459
DATED : January 31, 2006
INVENTOR(S) : Mykola Kyrylenko Lambertus Anthony Mary Voskulen It is certified that error appears in the above-identified patent and that said Letters Patent is hereby corrected as shown below:

On the title page, item (30): Foriegn Application Priority Data: should read

--April 28, 1999    (AU)            PP9991 --

Signed and Sealed this

First Day of August, 2006

JON W. DUDAS
*Director of the United States Patent and Trademark Office*